US012252432B2

(12) United States Patent
Grieco et al.

(10) Patent No.: US 12,252,432 B2
(45) Date of Patent: Mar. 18, 2025

(54) APPARATUS FOR DRYING AND/OR CONSOLIDATING A PREFORM FOR OPTICAL FIBRES

(71) Applicant: Prysmian S.p.A., Milan (IT)

(72) Inventors: Stefano Grieco, Milan (IT); Valeria Caronna, Milan (IT); Angelo Mascolo, Milan (IT)

(73) Assignee: Prysmian S.p.A., Milan (IT)

( * ) Notice: Subject to any disclaimer, the term of this patent is extended or adjusted under 35 U.S.C. 154(b) by 151 days.

(21) Appl. No.: 18/196,200

(22) Filed: May 11, 2023

(65) Prior Publication Data

US 2023/0382781 A1 Nov. 30, 2023

(51) Int. Cl.
*C03B 37/014* (2006.01)

(52) U.S. Cl.
CPC ................ *C03B 37/0146* (2013.01)

(58) Field of Classification Search
CPC .................................. C03B 37/0146
See application file for complete search history.

(56) References Cited

U.S. PATENT DOCUMENTS

| 3,933,454 A | 1/1976 | DeLuca |
| 4,906,268 A * | 3/1990 | Lane ................. C03B 37/01446 65/144 |
| 10,591,674 B2 | 3/2020 | Anderson et al. |
| 2005/0066690 A1 | 3/2005 | Yamashita et al. |
| 2020/0031706 A1* | 1/2020 | Grieco ................ C03B 37/0146 |

FOREIGN PATENT DOCUMENTS

| JP | 2003 212556 A | 7/2003 |
| WO | 2012/033158 A1 | 3/2012 |
| WO | 2018/177514 A1 | 10/2018 |

OTHER PUBLICATIONS

Search Report and Written Opinion (SRWO) for IT Pat. App. 202200010907 mailed Jan. 12, 2023 (8 pages).

* cited by examiner

*Primary Examiner* — Cynthia Szewczyk
(74) *Attorney, Agent, or Firm* — Shumaker, Loop & Kendrick, LLP

(57) ABSTRACT

An apparatus for drying and/or consolidating an at least partially porous optical fibre preform.

14 Claims, 10 Drawing Sheets

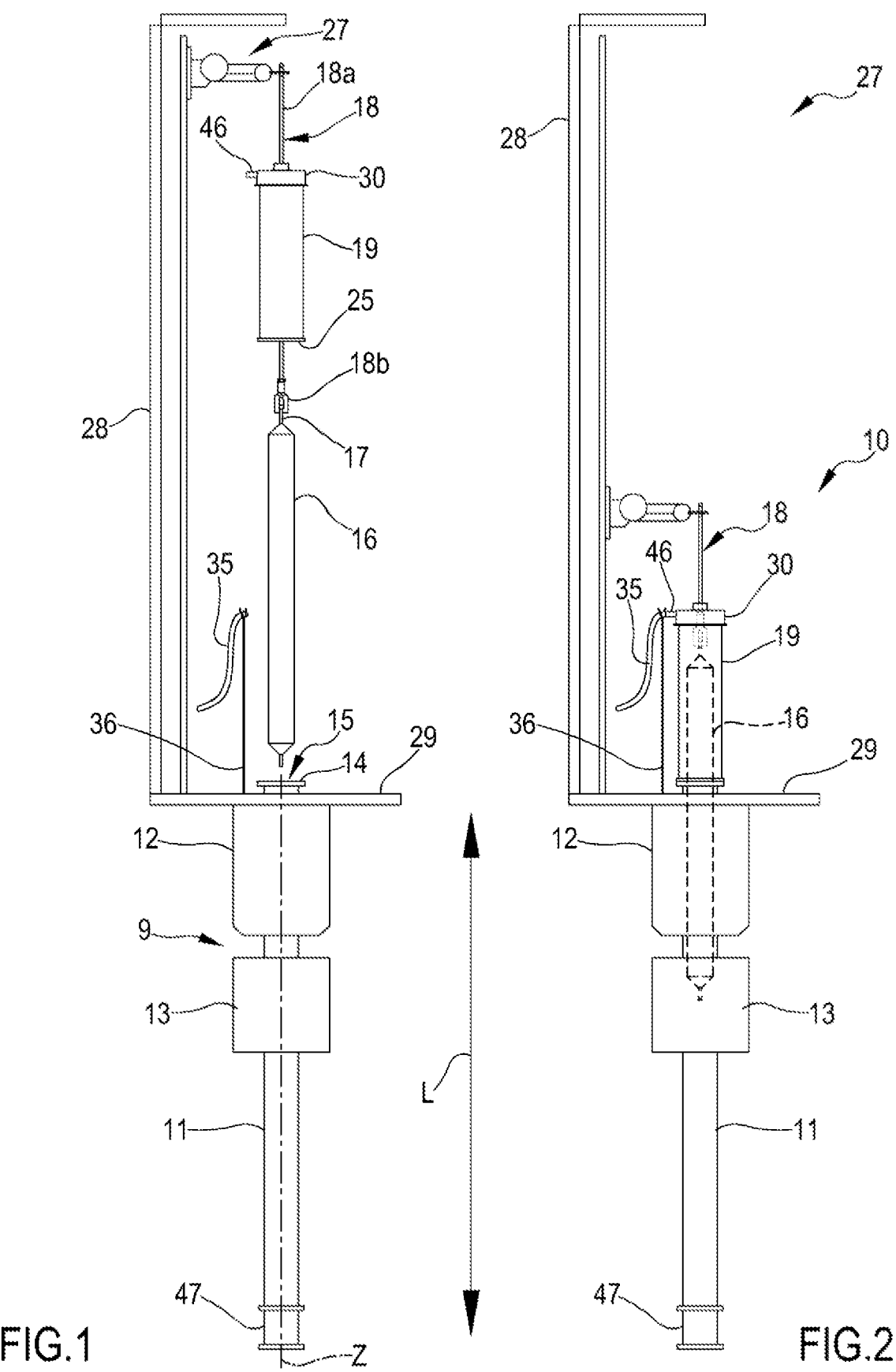

APPARATUS FOR DRYING AND/OR CONSOLIDATING A PREFORM FOR OPTICAL FIBRES

FIELD OF THE INVENTION

The present disclosure relates to an apparatus for processing an optical fibre preform, in particular a preform for the production of a transmission optical fibre.

BACKGROUND

A common procedure to obtain a glass preform to be drawn down to an optical fibre suitable for telecom applications comprises a first process for producing a core rod of solid glass and a second process in which an overcladding is added to the core rod, for example by deposition of soot about the core rod or by jacketing the core rod in a glass tube (rod-in-tube technology). Core rods may be made by outside deposition processes, such as outside vapour deposition (OVD) and vapour axial deposition (VAD) or by inside deposition processes, such as Modified, or Furnace Chemical Vapour Deposition (MCVD/FCVD), or Plasma Chemical Vapour Deposition (PCVD). When made by OVD or VAD, a soot precursor body is formed, which is the dried to remove water and consolidated to form a core glass body. A stretching often follows the consolidation in order to reduce the diameter of the glass body which is then severed into a plurality of core rods.

Formation of a cladding region on the core rod by a flame hydrolysis deposition process, such as by OVD, is often employed because it allows a relatively fast and economical process of producing a soot optical preform from a core rod. Partially porous soot preforms are subsequently treated with a drying agent and they are then consolidated inside a furnace into a dense glass preform at temperatures higher than the glass transition temperature.

U.S. Pat. No. 3,933,454 describes consolidating a soot preform by heating it to a temperature within the consolidation temperature range for a time sufficient to cause the soot particles to fuse and form a dense glass layer, and simultaneously subjecting the soot preform to a stream of a substantially dry chlorine containing atmosphere. The chlorine permeates the interstices of the soot preform during the consolidation thereof and replaces hydroxyl ions by chlorine ions, thereby resulting in a glass article that is substantially water-free.

U.S. Pat. No. 10,591,674 B2 relates to a system for positioning an optical preform in a furnace including an upper muffle and a downfeed handle disposed within a tube defining a first end and a second end, the second end extending into the upper muffle. The second end of the handle and a seal assembly is positioned around both the tube and the handle, which extends fully through the seal assembly and the tube. A top hat is positioned around the tube and below the seal assembly. Positioned at an interface between the top hat and the tube is a seal, which may be a lip seal. The seal is configured to allow sliding motion of the tube in and out of, or through, the top hat in a vertical, or Z-direction, while maintaining a seal to prevent or minimize the escape of gases within the preform consolidation system.

US 2005/0066690 A1 relates to a method and apparatus for producing an optical fiber without requiring a vertically large space. An apparatus described in the document is equipped with a drawing furnace having a cylindrical muffle tube, a furnace body and heating element. A framework-shaped gas-supplying section for supplying an inert gas is provided at the top of the furnace body. The top of the gas-supplying section is linked to the bottom of an expansion member (bellows). The opening of the bellows is provided with a contact seal or another sealing means in relation to the preform-holding rod to prevent oxygen from entering the drawing furnace.

In processes commonly used for dehydration and consolidation, a porous or partially porous soot preform is inserted into a furnace comprising a cylindrically-shaped muffle. The preform is then pulled up as a transparent silica glass preform above the furnace after vitrification.

Drying is performed by heating the preform to a typical temperature of about 1100° C. in the presence of one or more drying gases, such as a mixture of helium and chlorine. Consolidation is performed by heating the dried preform typically to a temperature between 1400° C. and 1600° C.

Given that drying and consolidation take place at different temperatures, the furnace muffle is often configured to have different zones for the drying and the consolidation phases. In some furnaces, during consolidation, the preform is lowered through a central hot zone set at a temperature inducing consolidation of the soot preform. In furnace tubes for dehydration and consolidation configured to house a moving preform across zones at different temperatures, the length of the chamber is typically required to be at least twice longer than the preform length.

Cost savings may be attained by the use larger preforms, such as preforms of increasing length, e.g. more than 2 m.

WO 2018/177514 A1 concerns an apparatus and method for drying and consolidating a preform, which comprises a chamber for housing at least a length portion of the preform, wherein the chamber can be connected to the first elongated chamber of the furnace tube so as to form a vertical extension of the first elongated chamber. The drying process may start with the preform not completely inserted into the furnace tube and the overall length of the furnace tube can be kept relatively short in relation with the length of the preform.

SUMMARY

Dehydration and consolidation of an optical fibre preform within a furnace typically takes place under a flow of an inert gas or of a gas mixture containing an inert gas. Helium is a preferred inert gas because it can be easily dissolved in the preform both as a single gas, for example during consolidation, and as a diluent carrier gas, such as during dehydration with chlorine-containing compounds or during fluorine doping of the preform.

The Applicant has observed that the quality of a consolidated preform depends, among other factors, on the gas flow of helium during processing of the preform. In particular, defects in the drawn optical fibre due to the presence of air has been seen to be associated with an insufficient flow of helium gas within the furnace. In many cases, bubbles/holes affect discontinuous short lengths of the optical fibre, these defects being commonly referred to as "airlines".

Airlines and defects related thereto can be detected from diameter measurement of optical fibres in the drawing process and in particular from diameter oscillations. A parameter indicative of the quality of the optical fibre is the so-called Draw Cumulated Defect Ratio (DCDR), which is defined as the ratio between the sum of the lengths (e.g. in meters) of the defective drawn optical fibre portions shorter than 18 m and the overall drawn fibre length. Good quality of an optical fibre is typically associated with a DCDR value of less than 2%, preferably less than 1%.

As an example, if in a drawn fibre length of 20 km five portions of defective fibre are found, said portions having respective length of 4 m, 10 m, 2 m, 5 m and 15 m (all shorter than 18 m), the DCDR is as follows:

$$\frac{(4+10+2+5+15)}{20,000} \times 100 = 0.18\%$$

A dehydration and consolidation furnace like that disclosed in WO 2018/177514 may require a helium flow rate of at least 20-40 slpm during processing of the preform. However, a high helium usage affects the final cost of the optical fiber.

In processes commonly used for dehydration and consolidation, a soot preform is inserted into a furnace comprising a quartz muffle tube, generally of cylindrical shape. The preform is suspended by a handle, which is joined or integral to the preform, for its insertion and extraction into/from the furnace and, typically, for the rotation of the preform about its longitudinal axis. To this purpose, an upper end of the preform handle is connected to a moving system for the translational movement and the rotational movement.

The Applicant has considered a heating apparatus for dehydration and consolidation of the type described in WO 2018/177514 A1, which includes an extension tube removably joined to the open top of a furnace muffle tube and closed by a top hood so as to form an extended chamber. More generally, in a heating apparatus for dehydration and consolidation of a preform, the processing gases are supplied into the furnace muffle from a gas inlet and a stream of gases flow around and through the preform inside the muffle to be discharged from an outlet, typically placed at the opposite side of the gas inlet, e.g. bottom to top.

The hood or any lid closing the top of the furnace tube needs a central aperture for the passing of the handle supporting the preform for its insertion/extraction in/from the furnace tube. The Applicant has noted that, if on one hand the central aperture should be designed to minimize or avoid leakages of the gases from the furnace, on the other hand any design should allow a free movement up and down and the rotation of the supporting handle within the central aperture.

Furthermore, the Applicant has observed that the supporting handle, commonly made of quartz, is often not precisely machined. This may lead to gas flowing out from the top central aperture during the vertical movement and rotation of the preform handle.

The Applicant has considered that, although the gas quantities involved are expected to be small, consumption of helium gas may turn out to be significant, given that processing time for dehydration and consolidation of a preform may last, for example, from 16 up to 20 hours with an helium consumption of about 25-35 l/min.

The quartz supporting handle carries a relatively heavy preform (for example of 5 to 100 kg) while undergoing vertical and rotational movements. Under these conditions, the handle is prone to build-up stresses that may induce off-axis bending, causing ovality or lack of conformity in the consolidated preform.

The Applicant has considered a chamber for housing at least partially a preform, which is closed on the top by a hood and has devised a sealing system positioned at a hood, the sealing system being aimed at reducing the leakage of processing gases from the chamber of the furnace to the outside.

It is herein disclosed an apparatus for drying and/or consolidating an at least partially porous optical fiber preform, comprising:
  a furnace comprising a muffle tube extending along a vertical axis and forming a hollow muffle chamber configured to house a preform, the muffle tube having a muffle opening at its top side, which is configured to allow passage of the preform;
  an extension tube forming a hollow extension chamber configured to house at least a length portion of the preform and having a central axis aligned in the vertical axis Z, wherein the extension tube has a lower opening and upper opening placed at the top side of the extension tube and opposite to the lower opening, and wherein the extension tube is removably attached to the muffle tube at the lower opening so as to close the muffle opening when the extension tube is joined to the muffle tube to form a single chamber,
  a hood placed on a top side of the extension tube and removably fixed to the same, the hood defining an inner space when fixed to the extension tube and including a discharge port and a hood cap with a hood through-hole which is substantially axially aligned to the upper opening, the hood through-hole and the upper opening being configured for the passage of a cylindrical supporting rod of a supporting handle for the suspension of the preform, and
  a flow control assembly including a sealing assembly operatively connected with the hood and substantially centred about the vertical axis, wherein the sealing assembly includes a ring-shaped seal and an expansible member having a generally tubular shape configured to allow passage of the supporting rod and to expand and contract in a vertical direction, wherein the ring-shaped seal is located radially inward of the expansible member and operatively connected thereto and has an inner diameter configured to directly contact the supporting rod.

The sealing system of the present description allows the use of a reduced helium flow rate during the processing of the preform while maintaining the quality of the consolidated preform. In addition, the flow control assembly of the present disclosure can prevent the penetration, directly or indirectly, of air into the consolidation gas recovery line, thus allowing an industrially profitable recycle of helium.

In several embodiments, the expansible member of the sealing assembly includes:
  a pleated portion configured to expand and contract in the axial direction thereby varying its axial length,
  a non-axially expandable portion contiguous to the pleated portion in the axial direction, and
  an expansible member base contiguous to the pleated portion and opposite to the non-expandable portion, the expansible member base extending radially outwardly of the pleated portion,
  wherein the ring-shaped seal is engaged to the non-axially expandable portion.

Provision of a flow control assembly comprising an axially expandable member (the expansible member of the present disclosure) allows absorbing mechanical stresses caused by potential offsets not only in the axial direction, but also in the radial direction, which are possibly caused by the vertical movement and rotation of the supporting handle and/or small variations of the internal pressure in the processing chamber due to the gasses flowing therein. In view of its flexibility, the expansible member may help in improving centring the supporting handle and managing microvariation in the pressure.

The hood may be made of metal, for example aluminium or anodized aluminium.

Typically, the extension tube and the muffle tube are made of quartz.

In an embodiment, the expansible member is one-piece.

In one or more embodiments, the non-axially expandable portion of the expansible member includes a radial cavity housing the ring-shaped seal, the ring-shaped seal being located within the radial cavity so as to extend to the most radially inward position of the sealing assembly.

In one or more embodiments, the expansible member is made of a polymeric material. For example, the expansible member is made of a thermoplastic polymer. For example, the expansible member is made of a thermoplastic fluoropolymer, such as PFTE (polytetrafluoroethylene), PCTFE (polychlorotrifluoroethylene) or PFA (perfluoroalkoxy alkane).

In one or more embodiments, the expansible member has a polymeric one-piece hollow tubular body.

In one or more embodiments, the ring-shaped seal is made of an elastomeric polymeric material. For example, the elastomeric material is a thermoset elastomeric material, such as fluoroelastomer, which are generally suitable for continuous use at relatively high temperatures, up to 200-300° C.

In one or more embodiments, the expansible member has an inner diameter, which varies across its length down to a minimum value, wherein the minimum value of the expansible member is larger than the inner diameter of the seal so as to allow the passage of the supporting rod.

In several embodiments, the extension tube includes a cover plate at its top side, the cover plate including the upper opening. The hood can be removably fixed to this cover plate.

According to an embodiment, the flow control assembly is placed in an open box placed at a top side of the hood. In this embodiment, the open box surrounds and houses the sealing assembly. In this embodiment the flow control assembly and the open box are axially centred to the hood through-hole. The box is open at its bottom side to be in communication with the inner space of the hood through the hood through-hole.

The sealing assembly may be substantially axially centred to the hood through-hole and operatively connected to the open box.

In an embodiment, the open box has a sidewall and a box flange contiguous to the box sidewall and extending radially inwardly therefrom to define a box through hole.

In embodiments having the expansible member of the sealing assembly including a pleated portion, a non-axially expandable portion and an expansible member base, the pleated portion and the non-expandable portion of the sealing assembly are housed within the box sidewall, whereas the expansible member base has an outer diameter and is fastened on the box flange, the box flange having an inner diameter smaller than the outer diameter of the expansible member base.

In an embodiment, the flow control assembly is housed within the inner space of the hood between the hood cap and the upper opening of the extension tube, and the sealing assembly is arranged so that the non-axially expandable portion engaging the ring-shaped seal lies above the pleated portion.

In an embodiment in which the extension tube includes the cover plate, the flow control assembly housed within the inner space of the hood further comprises: a plurality of springs radially surrounding the expansion member, and an annular supporting flange placed on the cover plate of the extension tube and below the expansible member base. The annular supporting flange is arranged about the vertical axis and around the upper opening of the extension tube, wherein the plurality of springs are mounted in the annular supporting flange and extend therefrom toward the hood cap.

In an embodiment, the supporting flange comprises an upper surface with the sealing assembly fixed to the upper surface, and the springs have a spring length sized to extend from supporting flange to the hood cap in a pre-set partially compressed condition. In this way, the hood cap urges the springs down in the axial direction.

The supporting flange may be made of metal.

In an embodiment, the supporting flange includes an outer sidewall around a hollow body, the outer sidewall has a radial through opening. This opening may be operatively coupled to a connecting pipe, which, in turn, is in communication with the exterior of the hood through a gas discharge port.

When fixing the expansible member base on the upper surface of the supporting flange, the base covers the upper opening of the extension tube, except for the passage for the cylindrical supporting rod. However, in view of the presence of the ring-shaped seal, which is in a tight connection with the supporting rod, the outflow of the gases exiting the extension chamber is substantially fully conveyed out through the radial through opening of the outflow flange.

In an embodiment, the connecting pipe has a relatively small diameter, for example of from 6 to 10 mm. Provision of a pipe of relatively small cross-section for the outflow decreases the extraction velocity and/or the flow rate of the exhaust gases, thereby decreasing the usage of helium during the processing of the preform.

In an embodiment, the apparatus comprises a washer between the cover plate and the supporting flange. The washer may be made of a polymeric material, such as fluoropolymer, or of graphite. Provision of a washer can reduce the risk of damaging the quartz cover plate caused by the contact with a supporting flange made of metal.

In an embodiment, the apparatus further comprises a supporting handle including a supporting rod and a holding portion at an end of the supporting rod. The supporting rod is inserted through the hood through-hole, wherein the ring-shaped seal is sized to surround and being in contact with the supporting rod when the latter is inserted in the extension tube. Before the processing of the optical fibre preform, the preform is suspended by the supporting handle inserted in the extension tube through the hood through-hole and it is placed above the extension tube for the down movement of the preform in the tube and then in the muffle tube.

The flow control assembly herein described can reduce the radial backlash between the through-hole connecting to the exterior and the supporting rod passing there-through, while allowing the axial and rotational movements of the preform handle.

Within the present description and claims by "axial direction" or "axially" it is meant a direction substantially parallel to an axis taken along the main extension of the processing chambers and of the vertical movements of the preform.

By "radially" or "radial direction" it is meant a direction substantially perpendicular to the axial direction.

BRIEF DESCRIPTION OF THE DRAWINGS

The present invention will now be described in more detail hereinafter with reference to the accompanying drawings, in which some, but not all embodiments of the invention are shown.

In general, the same reference numeral will be used for possible variant embodiments of similar elements. Drawings illustrating the embodiments are schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the disclosure.

The present disclosure can be implemented according to one or more of the present embodiments, optionally combined together.

FIG. 1 is a front view of an apparatus for drying and consolidating an optical fibre preform, in an initial process stage, in an embodiment consistent with the present disclosure.

FIG. 2 is a front view of the apparatus of FIG. 1, in a process stage subsequent to that of FIG. 1, when the preform is partially inserted in the furnace tube, according to a first embodiment. Details of the device including the sealing assembly are not shown.

Figure 3:
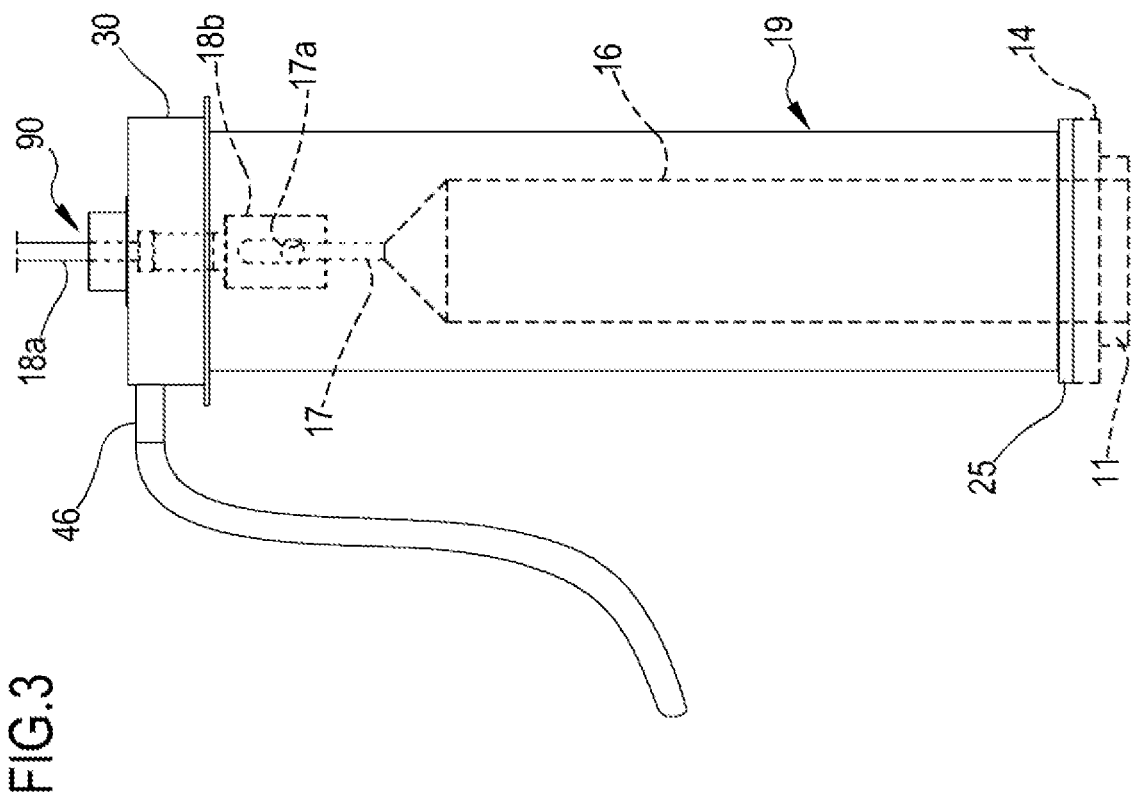

FIG. 3 is an enlargement of FIG. 2, showing a portion of apparatus 10 focusing on the extension tube.

Figure 4:
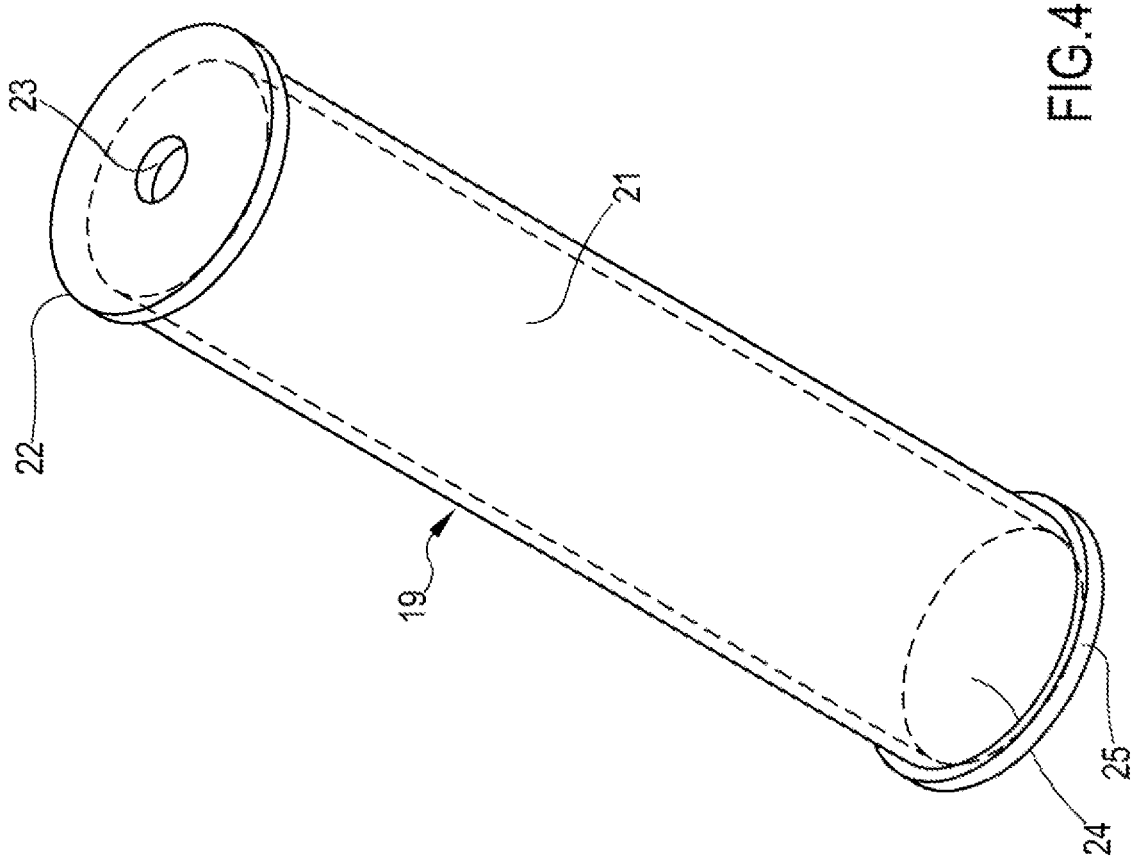

FIG. 4 is a perspective view of the extension tube of FIGS. 1-3.

Figure 5:
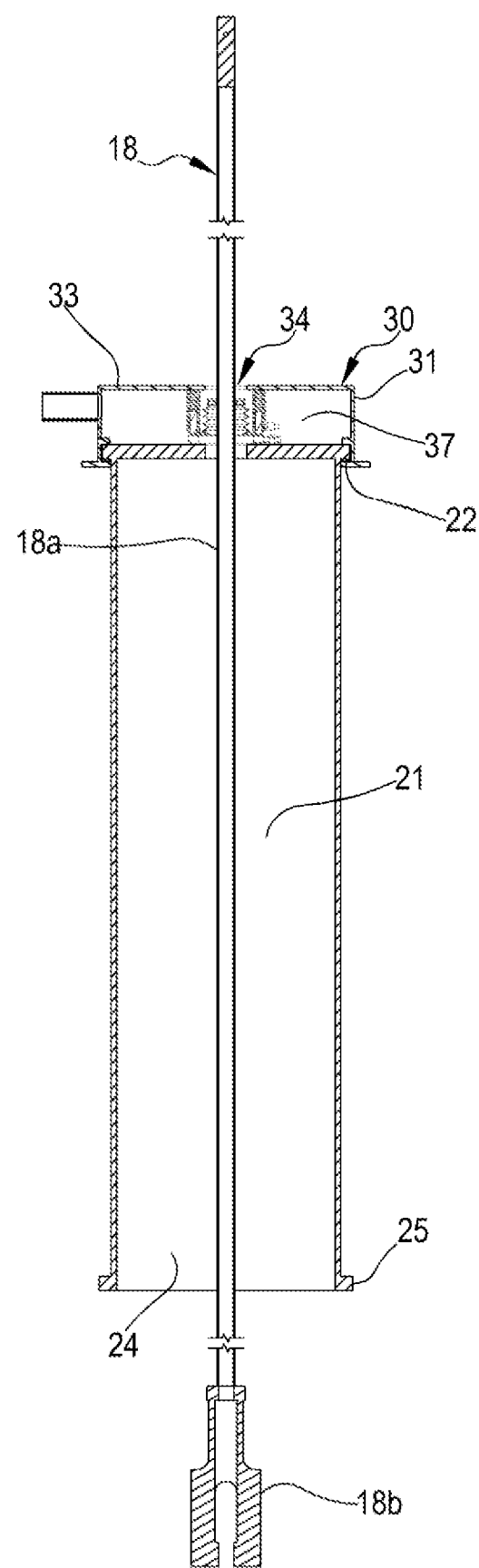

FIG. 5 is lateral view of the hooded extension tube with some parts shown in cross-sectional view to better highlight some details of a second embodiment according to the present disclosure.

Figure 6:
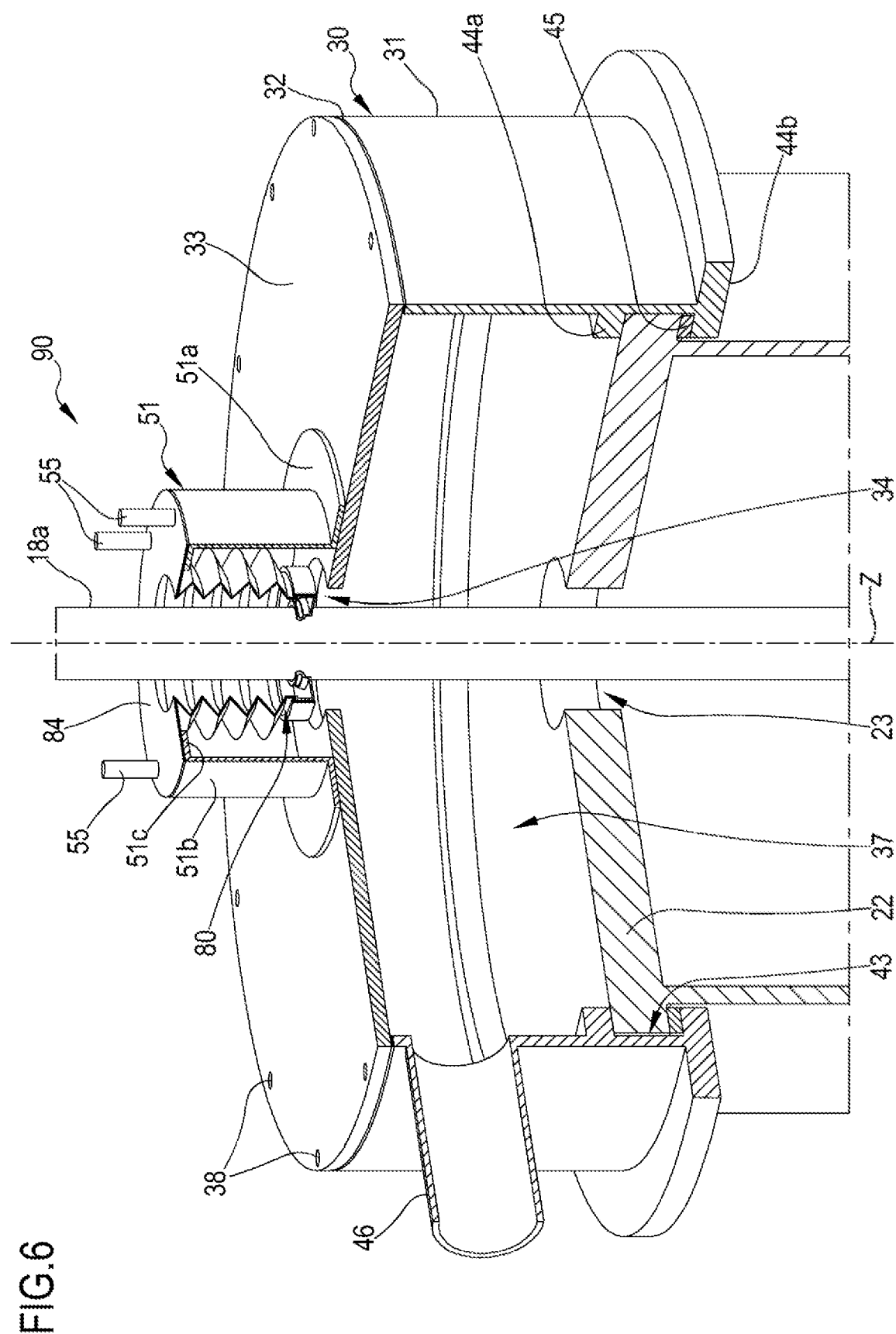

FIG. 6 is a partial perspective view of the top portion of FIG. 3, with some parts shown in cross-sectional view.

Figure 7:
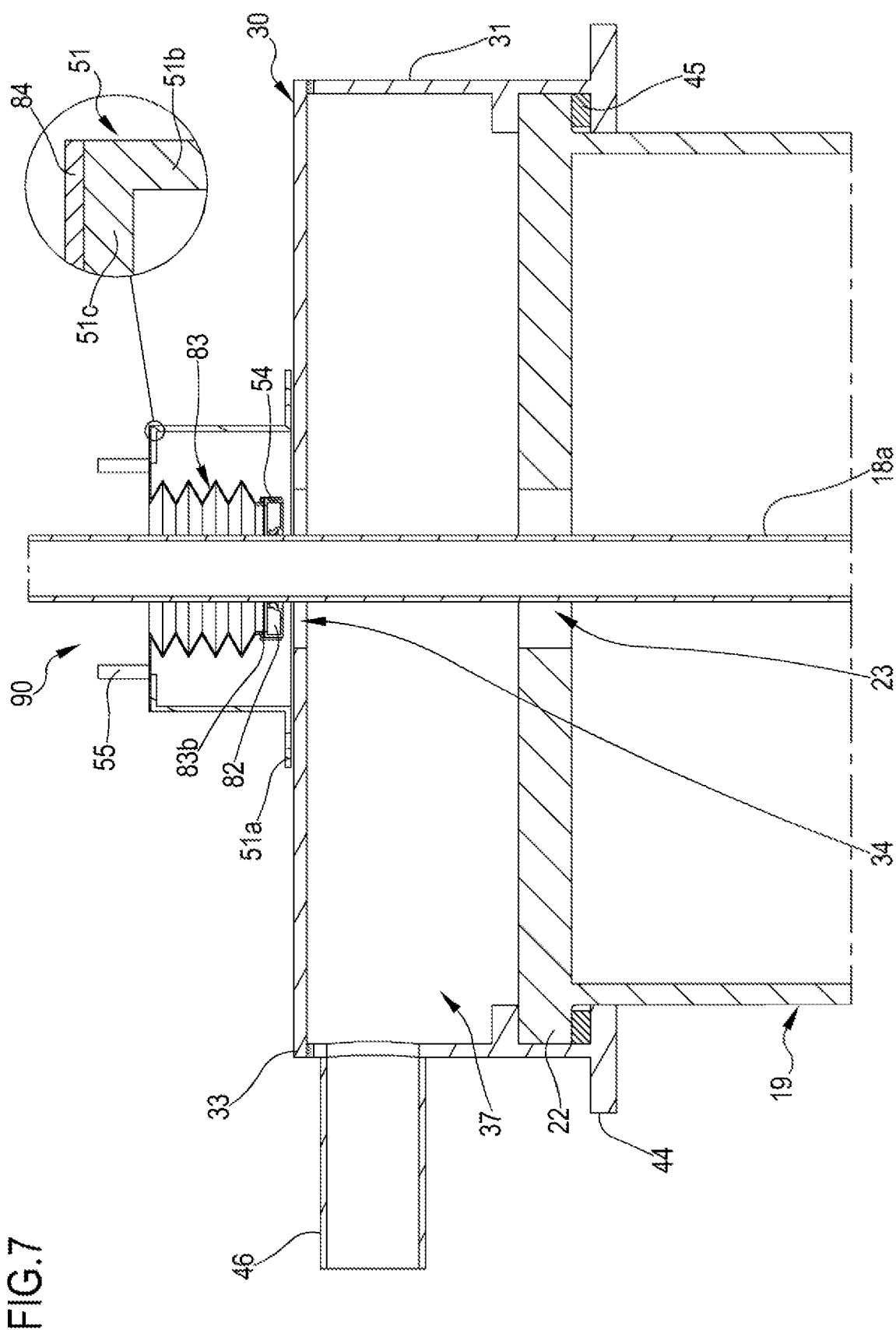

FIG. 7 is a partial longitudinal cross-sectional view of the top portion of FIG. 6.

Figure 8:
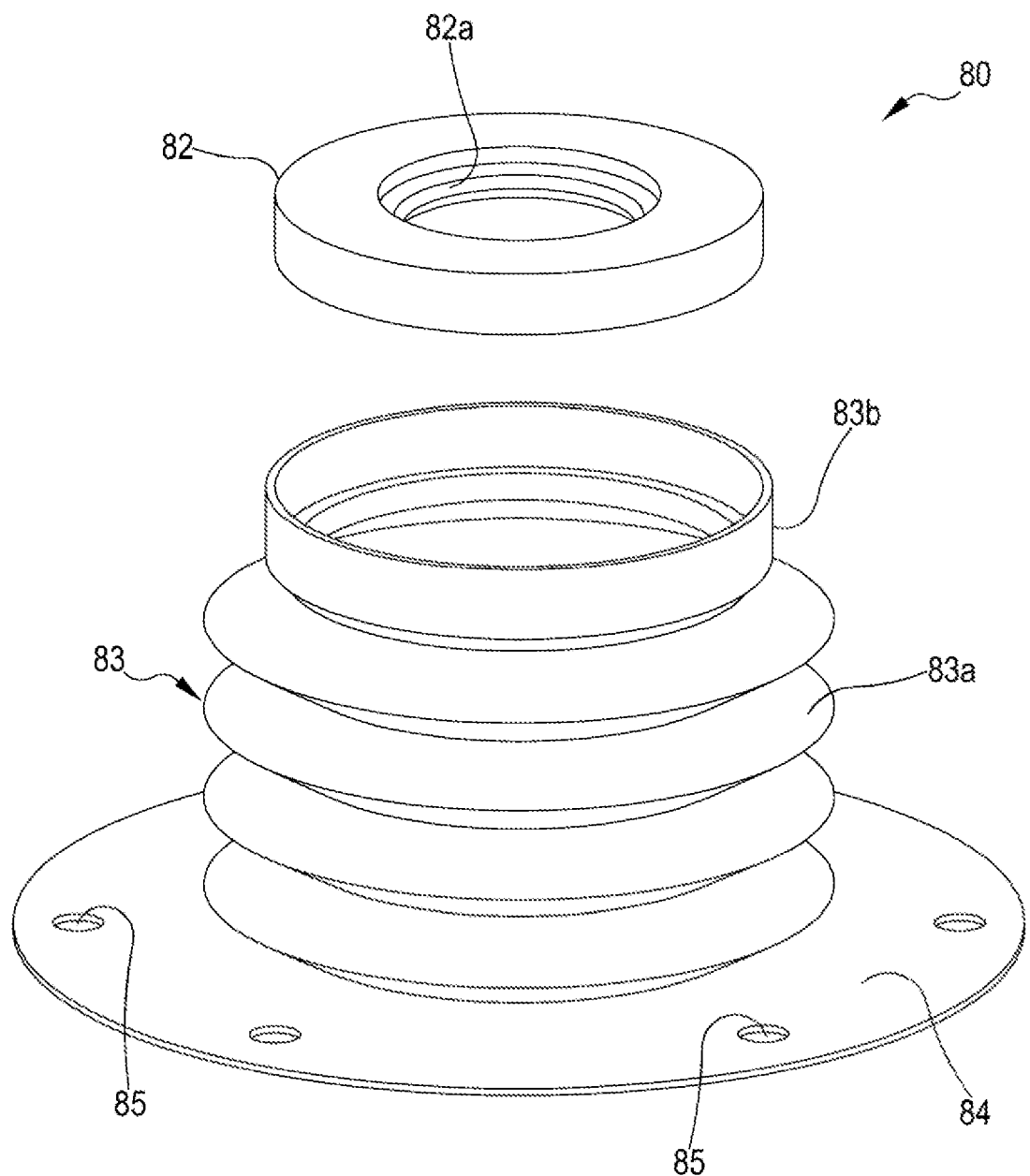

FIG. 8 is an exploded perspective view of the sealing assembly according to embodiments consistent with the present disclosure.

Figure 9:
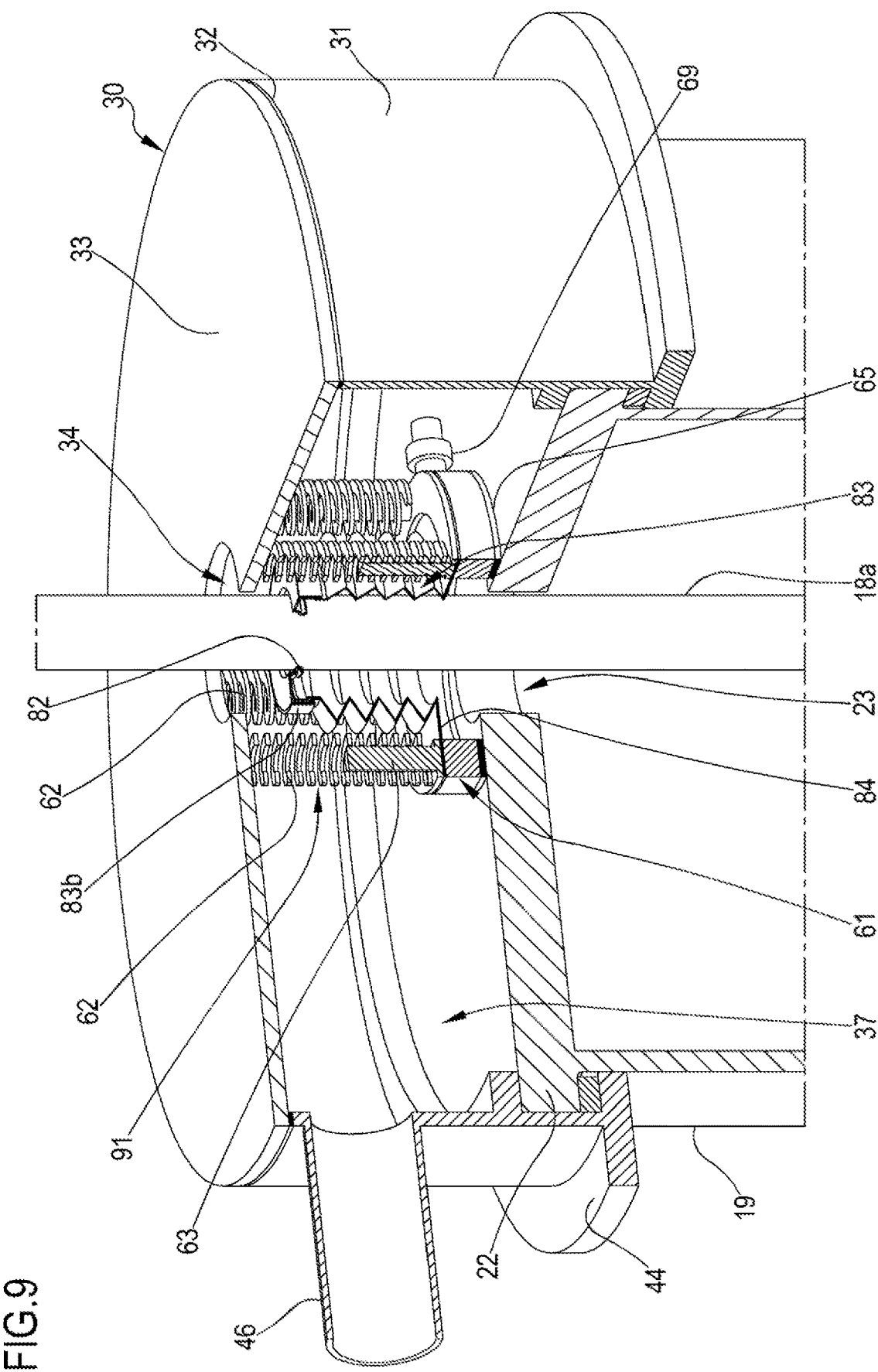

FIG. 9 is a partial perspective view of the top portion of a hooded extension tube, with some parts shown in cross-sectional view, according to the second embodiment of the present disclosure.

Figure 10:
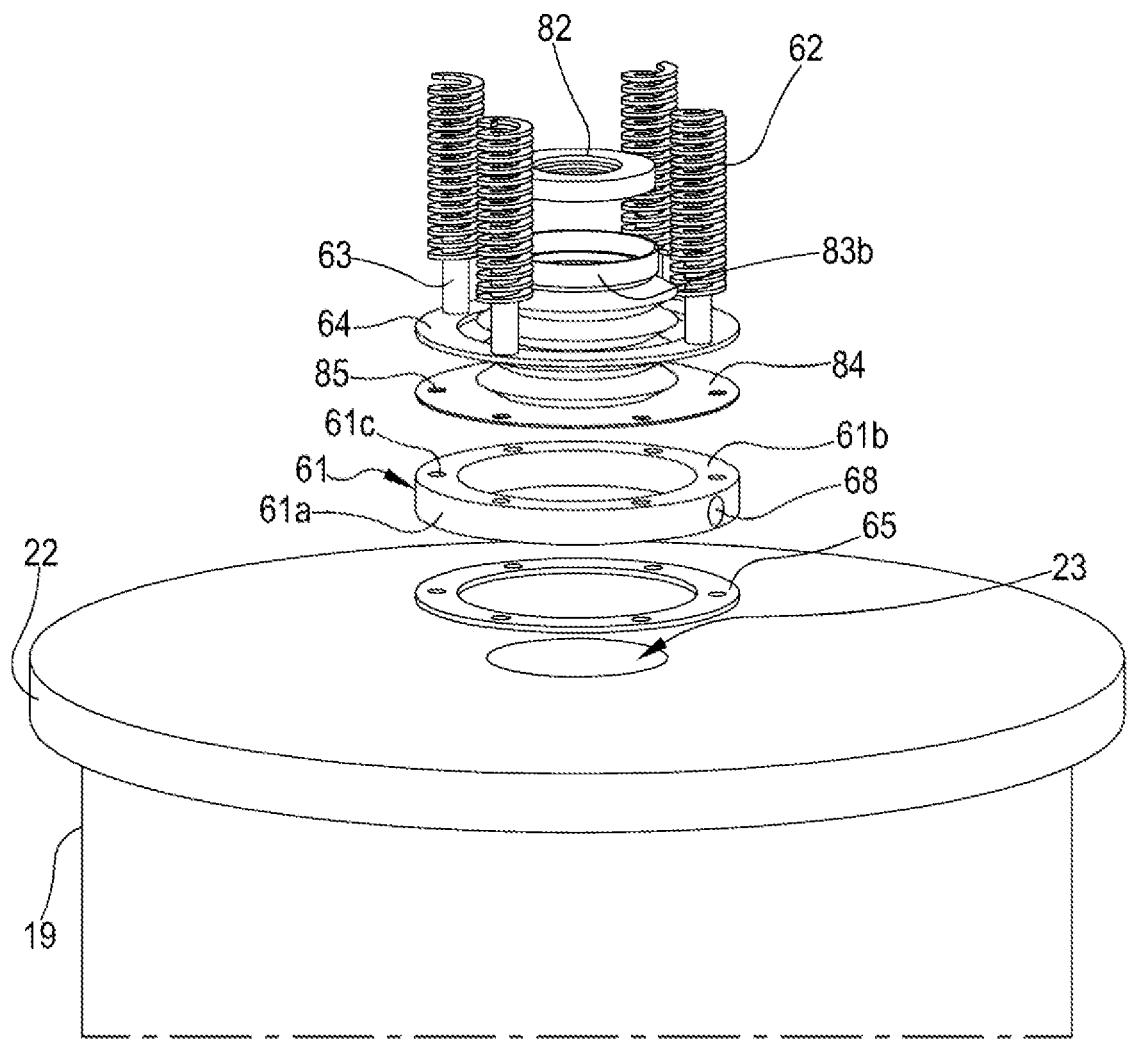

FIG. 10 is an exploded view of the flow control assembly of FIG. 9. The hood is not shown for clarity.

Figure 11:
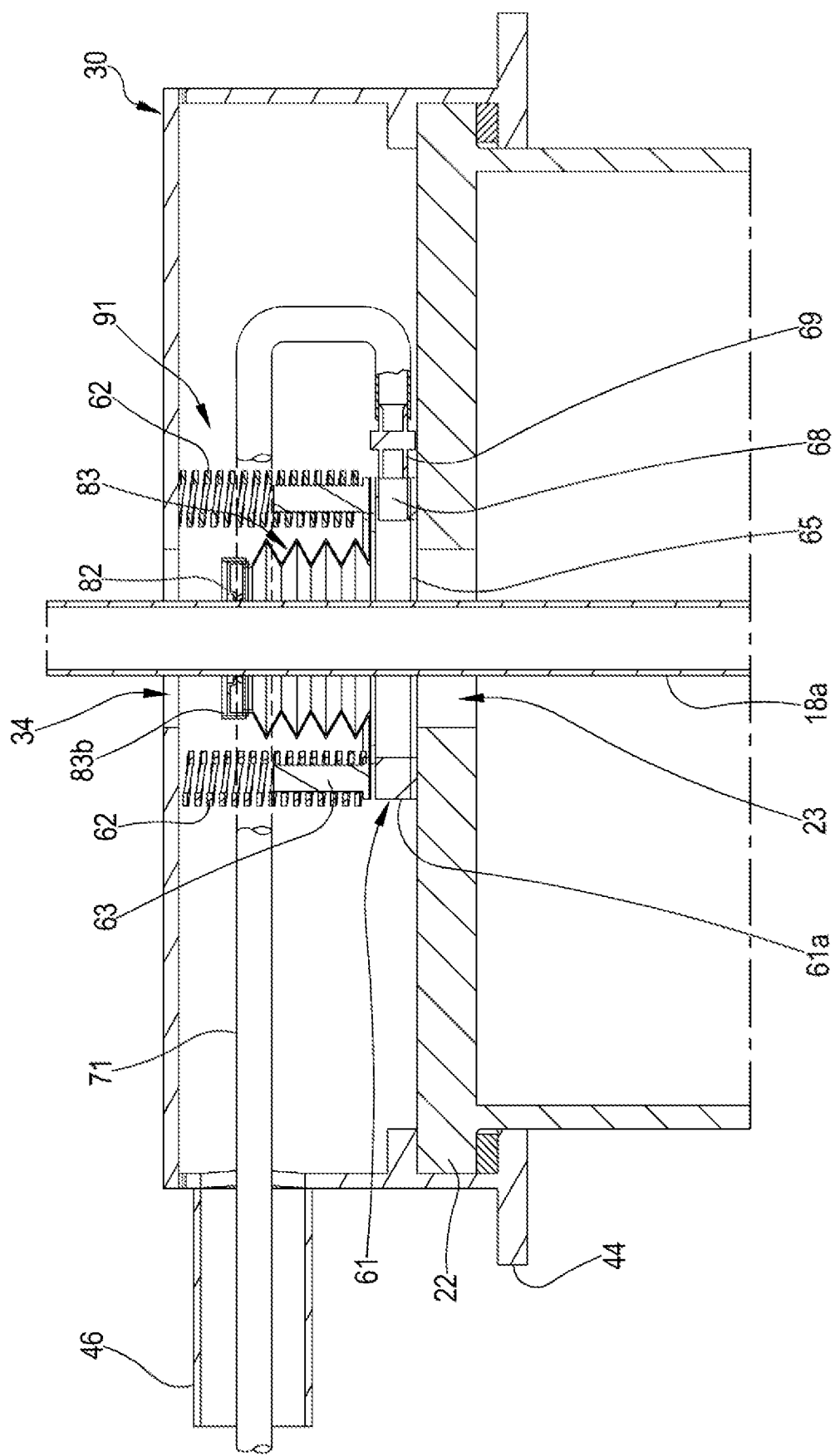

FIG. 11 is a longitudinal cross-sectional view of the top portion, according to an embodiment of the present disclosure.

Figure 12:
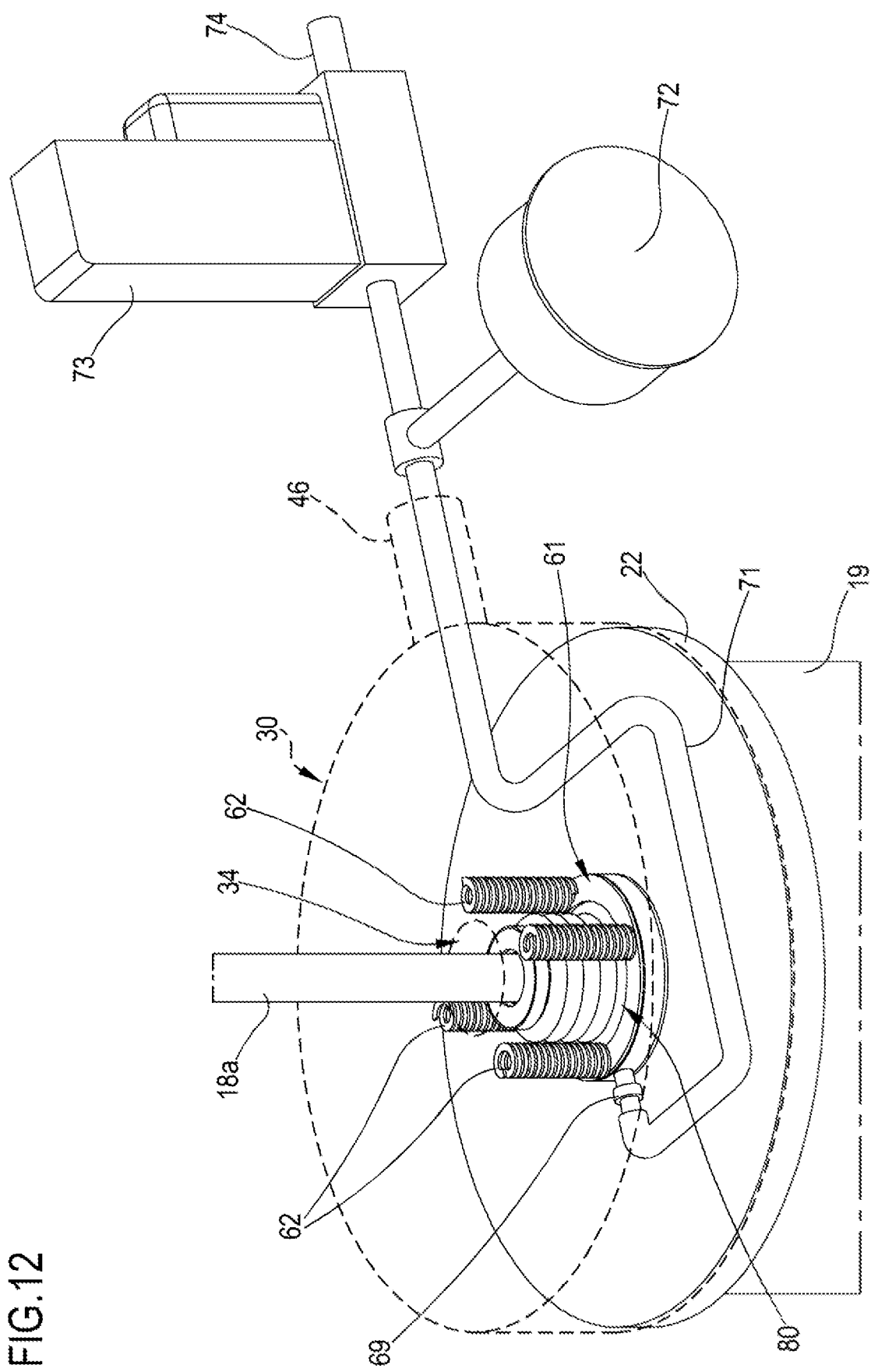

FIG. 12 is a partial perspective view of the hooded extension tube of FIG. 11 with the hood indicated with a dashed line to highlight some details of elements disposed within the hood.

DETAILED DESCRIPTION

FIGS. 1 to 3 illustrates an apparatus 10 for drying and consolidating an optical fibre preform 16, in an embodiment consistent with the present disclosure. The apparatus 10 comprises a furnace 9, which can be of conventional type, the furnace 9 comprising a muffle tube 11 of substantially cylindrical shape. The furnace 9 and specifically the muffle tube 11, when in use, extends along a vertical axis, indicated with axis Z, whereas double arrow L indicates the axial or vertical direction of the up or down movement of the preform 16 into or out of the muffle tube 11.

The terms "upper" and lower" or "top" and "bottom" or "below" and "above" when referring to the apparatus 10 are defined with respect to the vertical direction L or to an axial direction substantially parallel to the vertical direction L. These terms are used to indicate the relative position of the elements to one another in their orientation during processing of the preform.

The terms "inner" and "outer" or "radially inner" and "radially outer", with reference to the elements of the apparatus, are intended to refer to the relative radial position thereof.

The muffle tube 11 has an inner sidewall forming a hollow muffle chamber of substantially cylindrical shape. The muffle tube and thus the muffle chamber has a generally elongated shape configured to house an optical fibre preform 16. In particular, the muffle tube 11 has an opening 15 at the top side of the muffle, indicated in the following as muffle opening, which defines the opening for the passage (insertion-extraction) of a preform 16 in the muffle tube 11. In an embodiment, the opening 15 is centred about the Z-axis. Optionally, the muffle tube comprises an upper flange 14 extending radially outwardly from the muffle opening 15. The up and down movement of the preform 16 into the muffle tube is along the Z-axis.

The muffle tube 11 is made of glass, in particular of quartz. Customarily, muffle tubes for processing silica-based preforms for the production of optical transmission fibres are made of highly pure quartz to avoid contaminations in the preform during heating.

The furnace 9 further comprises a first heater 12 surrounding the muffle tube 11 in an upper length of the muffle tube. The first heater 12 defines a first heating zone extending over the upper length of the muffle tube 11 and thus of the furnace chamber. In operation, the first heating zone is set at a first temperature suitable for dehydration and/or doping of the porous layers of the preform. For example, the first temperature is of from 1000° C. to 1350° C.

A second heater 13, which is positioned below the first heater 12 in the axial direction L, surrounds the muffle tube 11. The second heater 13 defines a second heating zone extending over a lower length of the muffle tube 11. In operation, the second heating zone is set at a second temperature suitable for consolidation of the porous preform into a solid glass preform. The second temperature is higher than the first temperature and it is usually of from 1450° C. to 1600° C.

By "porous preform" in this application it is meant both a totally porous preform (e.g. for the formation of a glass core rod) and a partially porous preform comprising a porous soot layer for the formation of an intermediate cladding and/or an overcladding on the glass core rod.

In an embodiment, the overall length of the muffle tube 11 and thus of the furnace chamber, taken in the Z-axis, is greater than the length of the preform 16 so that the latter can move up and down, in the Z-axis, inside the furnace chamber. In an embodiment, the length of the furnace chamber is at least 1.5 times the length of the preform to be processed. For example, the preform has a length of from 2.0 to 3.5 meters.

Typically, first and second heaters 12, 13 are ring-shaped to surround the muffle tube 11. For example, each of heaters 12, 13 comprises one or more annular heating elements.

The apparatus 10 further comprises a hollow extension tube 19. The extension tube 19 has an inner sidewall to form a hollow extension chamber 21 of substantially cylindrical shape. The extension tube 19 has a top side and a bottom side.

The extension tube 19 is configured to encircle at least a length portion of preform 16. For example, the length and width (diameter) of the extension chamber are sized to house at least a length portion of the preform. In an embodiment, the extension tube 19 is made of quartz.

Typically, the preform 16 is provided with a preform handle 17 made of quartz, which can be joined or integral to the preform.

Dimensions of the muffle tube 11 and of the extension tube 19 may be selected based on the dimension of the preform to be processed in the apparatus so as to allow a down and up movement of the preform 16 without the inner sidewall of the chambers touching the preform. The preform 16 is suspended and supported by a supporting handle 18, typically made of quartz, which comprises a supporting rod 18a and a holding portion 18b positioned at a bottom end of the supporting rod 18a and configured to hold the preform handle 17. In the non-limiting example of FIGS. 1-3, the holding portion 18b is a C-shaped hook integral to the supporting rod 18a. In this example, more clearly seen in FIG. 3, suspension of the preform 16 makes use of an enlarged-width portion 17a of the preform handle 17, such as a ball-shaped portion, which is housed in the holding portion 18b of the supporting handle 18.

A gas-discharge hood 30 (herein indicated as "hood"), described in more detail in the following, is placed on top of the extension tube 19 and comprises a gas discharge port 46, for example in a hood sidewall 31. The hood 30 is removably fixed to the extension tube 19.

The gas-discharge port 46 can be connected with an external exhaust pipe 35 (shown in FIGS. 1-3), for the discharge of gases flowing during the processing of the preform 16, when the extension tube 19 is connected with the muffle tube 11.

In the example of FIGS. 1-3, the exhaust pipe 35 is placed at a height corresponding to the vertical position of the hood 30 for connection with the gas discharge port 46, when the extension tube 19 is joined to the muffle tube 11. For example, a shaft 36 is placed in the vicinity of the muffle opening 15 for holding the exhaust pipe 35 in position for the connection to the gas discharge port 46 of hood 30. It is to be understood that the presence of elements 35, 36 is optional since other configurations may be envisaged for the discharge of the gases from the extension chamber 21 during dehydration and/or consolidation of the preform.

In known ways, the supporting handle 18 is operatively connected to a moving system 27, only partially shown in the figures. The moving system 27 is designed for the vertical movement of the preform 16, e.g. insertion and extraction of the preform in/from the muffle tube 11 and for the rotational movement of the preform about the Z-axis. The moving system 27 is further designed for the vertical movement of the extension tube 19, this vertical movement being independent from the vertical movement of the preform 16. In the figures, only the up and down transport mechanism of the preform is schematically shown. The moving system 27 may be of the type described in more detail in WO 2018/177514 A1.

In an initial stage shown in FIG. 1, the preform 16 is positioned above the muffle tube 11, while the extension tube 19 is positioned in axial alignment with the preform 16 and, in the example shown in the figure, the extension tube 19 is placed above the preform 16.

FIG. 2 shows a subsequent stage in which the preform 16 is partially inserted in the muffle tube 11 and the extension tube 19 is lowered onto the preform 16 so as to surround it.

The extension tube 19 may descend to surround an upper length portion of the preform 16 before or after the preform 16 is partly inserted in the furnace 9.

In an embodiment, processing of the preform 16 starts with a lower length portion of the preform 16 inserted in the muffle tube 11 so as to be substantially positioned in the first heating zone defined by the first heater 12. If the first heating zone is placed close to the muffle opening 15 of the muffle tube 11, the length of the inserted lower portion of the preform 16 approximately corresponds to the length of the first heating zone, as schematically shown in FIG. 2, so as an upper portion of the preform 16 lies outside of the muffle tube 11.

In the embodiment shown in FIGS. 1 and 2, a tower 28 acts as a supporting structure for the moving system 27. The tower 28 may stand on a supporting plane 29. In the non-limiting example shown in FIGS. 1-2, the supporting plane 29 is a floor area having an opening for communication with the muffle tube, positioned below the floor area (not shown).

With reference to FIG. 4, the extension tube 19 forming the extension chamber 21 is provided at one of its ends, at the bottom side, with a lower opening 24 configured to encircle the preform 16. Opposite to the lower opening 24, a cover plate 22 is provided at the top side of the extension tube 19 and includes an upper opening 23 in the form of a through-hole for the passing of the supporting rod 18a of the supporting handle 18. The upper opening 23 is centrally positioned in said cover plate 22. In particular, the upper opening 23 is substantially centred about the vertical axis Z.

In the embodiments shown in the figures, the cover plate 22 includes an outer flange extending radially outwardly the extension tube 19 to ease fastening of the hood 30 to the extension tube 19, as described in more detail hereinafter.

In an embodiment, the length of the extension tube 19 is sized to house at least a length portion of the preform 16, specifically its upper length portion.

In an embodiment, the extension tube 19 includes a bottom rim flange 25 at the lower opening 24, the bottom rim flange 25 extending radially outwardly from the lower opening 24. The bottom rim flange 25 has annular shape.

In one or more embodiments, the extension tube 19 is one-piece, with tube, cover plate and flange(s) being made of quartz.

The hood 30 is removably fixed to the cover plate 22 so as to be attached to and detached from the extension tube 19.

As already said above, in an embodiment, the muffle tube 11 comprises an upper flange 14 (as from FIGS. 1 and 3) extending radially outwardly the muffle opening 15, at the top side of the muffle tube 11. The upper flange 14 has annular shape. The muffle tube 11 is preferably one-piece with the upper flange 14.

When the extension tube 19 is lowered onto the muffle tube 11 to join its upper flange 14 with the bottom rim flange 25 of the extension tube 19, the upper surface of flange 14 and the lower surface of rim flange 25 are put in contact to one another so as, by joining these surfaces, a sealed chamber is formed by the extension chamber 21 defined by the extension tube 19 and the chamber of the muffle tube 11.

In an embodiment, the muffle tube 11 and the extension tube 19 are made of glass, preferably of quartz, and joining of the muffle tube with the extension tube is a glass-to-glass seal between the joining surfaces of flanges 14 and 25. While the weight of the extension tube 19 is suitable to provide an airtight contact with the muffle tube 11, one or more O-rings or gaskets may be provided at the interface between of the flanges 14 and 25 as an optional safeguard for the glass material. In an embodiment, the O-ring's or gasket's may be made of a thermoresistant polymer like perfluoroelastomer, or of graphite.

In an embodiment, the diameter of the furnace chamber, i.e. the inner diameter of the muffle tube 11, is substantially equal to the diameter of the extension chamber, i.e. the inner diameter of the extension tube 19.

The furnace 9 comprises one or more gas inlets, only schematically indicated in the Figures with gas inlet part 47 (FIGS. 1 and 2), which is connected with the hollow chamber of the muffle tube 11 for the supply of one or more gases passing through and/or around the preform 16. In the embodiments shown in FIGS. 1 and 2, gases enter the furnace chamber from the bottom of the muffle tube 11 and stream upwards. As described in the foregoing, in operation, namely during processing of the preform 16, the extension tube 19 is joined to the muffle tube 11 to form a sealed chamber and gases are discharged outside the extension chamber 21 from the gas discharge port 46 of the hood 30. Typically, the gas discharge port is positioned at the opposite side of the furnace with respect to the gas inlet part 47. In the embodiment shown in the figures, the gas discharge port 46 is positioned at the opposite side of the sealed chamber with respect to the gas inlet part 47, in particular with gas flowing from bottom to top.

The apparatus 10 is suitable for drying and consolidating a porous optical fibre preform. In an embodiment, the preform, before undergoing dehydration and/or consolidation, has a porous overcladding layer formed around a glass core rod.

When the extension tube 19 is joined to the muffle tube 11 and the hood 30 is mounted on the extension tube 19, the sealed chamber is in communication with the exterior by means of a hood through-hole 34 positioned at the top of the hood, i.e. in hood cap 33. The hood through-hole 34 is centrally positioned about the Z-axis for the passing of the supporting handle 18 and in particular of the supporting rod 18a in the hood cap 33.

In known ways, dehydration and consolidation of the preform 16 is achieved by moving the preform through the first heating zone of a relatively limited length, i.e. shorter than the length of the preform, and then to the second heating zone. The muffle tube 11 may extend below the second heating zone for a length configured to house the whole preform as a cooling zone. Typically, cooling is carried out after consolidation while flowing inert gas, such as helium, across the muffle tube.

The dehydration process starts by drying the portion of the preform positioned in the first heating zone. In an embodiment, the portion of the preform inserted in the muffle tube 11 lies above the second heating zone so as to prevent consolidation of the lowermost portion of the preform to take place before its drying. Typically, the first heating zone is at a temperature of from 1000° C. to 1200° C. The preform is maintained in this position for a certain time, such as from 60 to 90 minutes. Subsequently, the preform is gradually lowered through the first heating zone at a given rate so as to dehydrate the whole preform when the entire preform length has passed the first heating zone. The lowering rate may be of from 4 mm/min to 8 mm/min.

When the preform is down driven through the first heating zone, successive longitudinal portions of the preform are exposed to the first heating zone and subsequently to the second heating zone. The second heating zone is set at a temperature suitable for vitrification, typically of from 1450° C. to 1600° C.

Typically, during dehydration and consolidation, the preform rotates about its longitudinal axis in order to improve axial symmetry. In ways per se known, a rotation transmission mechanism (not shown) coupled to the supporting handle 18 transmits rotation to the preform.

In an embodiment, the porous glass soot preform is a silica-based porous glass preform for the fabrication a silica-based optical fibre of low attenuation for use in telecommunication systems. The porous soot layers can be formed by known methods, such as a flame hydrolysis process of silica-based soot or combustion of silica-based reactants as octamethylcyclotetrasiloxane (OMCTS, also called D4).

In an embodiment, the preform, before undergoing dehydration and/or consolidation, has a porous overcladding layer formed around a glass core rod. In ways per se known, after consolidation, the solid glass preform can be drawn in an optical fibre.

It is to be understood that the arrangement and length of the heating zones with respect to the preform may be different from those described above and shown in the embodiments of FIGS. 1 and 2. For example, in alternative to the illustrated embodiment, the furnace 9 may have a single heating zone for dehydration and/or consolidation.

After cooling, the muffle tube 11 is opened by lifting the extension tube 19 above the muffle tube 11 to allow the removal of the preform 16 from the muffle tube 11.

FIGS. 1-3 illustrate an apparatus having a flow control assembly 90 according to an embodiment described in more detail with reference to FIGS. 6 and 7, whereas FIG. 5 shows a flow control assembly 91 according to the embodiment described in more detail in FIGS. 9-12. However, the description of the embodiments described with reference to FIGS. 1-S can be applied to any embodiment of the flow control assembly herein disclosed.

As more clearly shown in FIGS. 5-7, 9, 11-12, the hood 30 defines an inner space 37 when the hood is fixed on the extension tube 19. The hood 30 includes a sidewall 31 and a hood cap or top plate 33 arranged on the sidewall 31. The hood cap 33 includes the centrally positioned through-hole 34 for the passing of the supporting rod 18a.

In an embodiment, the hood 30 is made of metal, for example aluminium or anodized aluminium.

In operation, the hood 30 is fastened to the cover plate 22 of the extension tube 19.

In an embodiment, the hood cap 33 and sidewall 31 are two distinct pieces, as from FIGS. 5 to 10, the hood cap 33 being removably connected to the hood sidewall 31. In the illustrated examples, the hood cap 33 is fastened to the sidewall 31 by means of screws 38.

An O-ring seal 32 may be provided between the cap 33 and the sidewall 31. For example, the O-ring seal 32 is lodged in a groove (not visible) provided around the joining surfaces of the cap 33 and sidewall 31. By hindering gas leaking from the peripheral region of the hood, provision of an O-ring seal 32 allows a more accurate control of gas inflow/outflow from the hood through-hole 34, as described in more detail hereafter.

In alternative, cap 33 and sidewall 31 of the hood 30 may be one-piece.

The hood 30 has a substantially cylindrical shape to fit onto the extension tube 19. However, the shape should not be considered limitative. When the hood 30 is placed on top of the cover plate 22 of the extension tube, the hood through-hole 34 is in-axis with the upper opening 23 for the insertion of the supporting rod 18a through the inner space 37 of the hood 30 and entry into the extension tube 19 through the opening 23.

In an operative position, the through-hole 34 is in communication with the inner space 37 of the hood. As indicated above, the through-hole 34 is opened at the top side of the hood to put in communication the muffle tube 11, via the extension tube 19, with the exterior.

In an embodiment, the through-hole 34 and the upper opening 23 have both a circular cross-section with a centre positioned substantially on the same axis (e.g. Z-axis).

In the non-limiting examples illustrated in the figures, the gas discharge port 46 is formed in the sidewall 31 of the hood 30.

The hood 30 is connected to the extension tube 19 through its cover plate 22. In the illustrated embodiments, the hood 30 comprises two ribs 44a, 44b positioned at the bottom of the sidewall 31. Rib 44a projects radially inwardly with respect to the hood sidewall 31 and rib 44b, which is positioned below rib 44a, projects both radially inwardly and outwardly with respect to sidewall 31 (FIG. 6). The ribs 44a, 44b are vertically spaced to form a groove 43 in the inner of the hood sidewall 31. The groove 43 is configured to seat the outer flange of the cover plate 22 thus connecting the cover plate 22 to the sidewall 31 of hood 30 in a tight configuration. In this way the hood 30 can be mounted on top of the extension tube 19 by encircling and gripping the outer flange of the cover plate 22.

For example, the hood sidewall 31 can include two semi-circular sections having two vertical ends, each end being provided with a respective connecting plate protruding outwardly and fastened to one another by fixing elements (details not shown in the Figures).

The Applicant has observed that the temperature reached in the extension tube 19, though lower than that in the muffle tube 11, may cause damages at or in the vicinity of the cover plate 22 of the extension tube, which is made of quartz. This may be caused by the contact of the quartz cover plate 22 with the hood 30, which is made of metal and thus prone to thermal expansion.

To help ensuring the integrity of the cover plate 22, a gasket 45 (FIG. 6) may be interposed between cover plate 22 and hood 30 (in particular, between the lower rib 44b and the lower surface of the flange of cover plate 22). The gasket 45 may be made of a suitably thermoresistant polymeric material or of graphite.

The apparatus 10 comprises a flow control assembly 90, 91 including a sealing assembly 80 directly or indirectly connected with the hood 30. The flow control assembly 90, 91 is designed to at least partly seal the through-hole 34 of the hood 30 in communication with the exterior of the apparatus 10 so as to prevent the inflow of gases, in particular of atmospheric air, from entering into the hood. Atmospheric air would dilute the processing gases flowing from the processing chambers housing the preform to the recycling process. At the same time, the flow control assembly 90, 91 is designed to allow the vertical movement and the rotation of the supporting rod 18a of the supporting handle 18 through the through-hole 34 of the hood 30 and the upper opening 23 of the extension tube.

When the hood 30 is connected with the extension tube 19 and the extension tube 19 is connected with the muffle tube 11, a sealed chamber is formed by the joining of the extension tube 19 with the muffle tube 11, the sealed chamber being in communication with the exterior through the hood through-hole 34.

With reference to the embodiment of FIG. 8, the sealing assembly 80 comprises a ring-shaped seal 82. The seal 82 is sized to surround the supporting rod 18a when the latter is inserted in the extended elongated chamber. In particular, the seal 82 has an inner diameter configured to directly contact the outer diameter of the supporting rod 18a.

In an embodiment, the seal 82 includes a sealing lip 82a (visible in FIGS. 8 and 9) for engagement with the supporting rod 18a of the supporting handle 18. The seal 82 may also include a garter spring (not shown in the figures), for example coupled to the sealing lip 82a, for a tighter contact with the supporting rod 18a while the latter axially moves and rotates about its axis.

In embodiments, the ring-shaped seal 82 is made of a thermoset elastomeric polymer, for example of a fluoropolymer (fluoroelastomer), which are generally suitable for continuous use at relatively high temperatures, up to 200-300° C.

The sealing assembly 80 further comprises an expansible member 83 configured to expand or contract in an axial direction, in particular in the Z-axis. The expansible member 83 has a tubular shape with an inner diameter configured to allow the passage of the supporting rod 18a. In embodiments, the expansible member 83 comprises a pleated portion 83a configured to expand and contract in the axial direction and a non-axially expandable portion 83b contiguous to the pleated portion 83a in the axial direction. In an embodiment, the non-axially expandable portion 83b is one-piece with the pleated portion 83a.

The pleated portion 83a has a length varying, in the axial direction L, from a minimum value to a maximum value.

As described in more detail hereafter, the inner diameter of the expansible member 83 and in particular of the pleated portion 83a may vary across its length, provided that its minimum inner diameter is equal to or larger than the inner diameter of the ring-shaped seal 82 so as to allow the passage of the supporting rod 18a.

In embodiments, the minimum inner diameter of the expansible member 83 is larger than the inner diameter of the ring-shaped seal 82 so that the supporting rod 18a, in typical conditions during processing of the preform, is in contact only with the seal 82.

The non-axially expandable portion 83b has an annular shape with an inner diameter and an outer diameter in the radial direction. In the expansible member 83, the minimum inner diameter of is sized so as to leave a radial gap around the supporting rod 18a for an axial movement through the hood 30 with limited radial offset. In an embodiment, the minimum inner diameter of the expansible member 83 corresponds to the inner diameter of the non-expandable portion 83b.

To facilitate the fastening of the sealing assembly 80 directly or indirectly to the hood 30, the sealing assembly 80 comprises a base 84 for the expansible member 83, in the following, expansible member base 84, contiguous to the pleated portion 83a and opposite to the non-expandable portion 83b of the expansible member 83 (more clearly visible in FIG. 8). Expansible member base 84 extends radially outwardly of the pleated portion 83a to leave a hollow passage ranging from the minimum to the maximum inner diameter of the expansible member 83. Expansible member base 84 may be one-piece with the pleated portion 83a.

In embodiments, the expansible member 83 is one-piece.

According to FIG. 8, the expansible member base 84 comprises a plurality of holes for the fastening of the sealing assembly 80 directly or indirectly to the hood 30.

The ring-shaped seal 82 is operatively connected to the expansible member 83 and in particular to its non-axially expandable portion 83b. In the embodiments shown in the figures, the ring-shaped seal 82 is housed within the non-expandable portion 83b of the expansible member 83. With reference to FIGS. 6, 7, 9 and 11, the non-axially expandable portion 83b includes a radial cavity configured to house the ring-shaped seal 82, which is located within the radial cavity so as to extend up to the most radially inward position of the sealing assembly 80 with respect to the central axis Z. In this way, the most radially inward position of the sealing assembly corresponds to the inner diameter of the ring-shaped seal 82.

In an embodiment, the inner diameter of seal 82 is sized to have a tight connection with the supporting rod 18a.

In embodiments, the ring-shaped seal 82 is held in place by the non-expandable portion 83b by compression.

As the ring-shaped seal 82 is operatively connected with the supporting rod 18a and the expansible member 83, through the expansible member base 84, is directly or indirectly connected to the hood 30, the pleated portion 83a is suitable to compensate any potential offsets between the fixed elements 82 and 84. In an embodiment, the expansible member 83 is made of a thermoplastic polymer. For example, the expansible member is made of a thermoplastic fluoropolymer, such as PFTE (polytetrafluoroethylene), PCTFE (polychlorotrifluoroethylene) or PFA (perfluoroalkoxy alkane).

In a first embodiment of the present disclosure illustrated in more detail in FIGS. 6 and 7, the apparatus 10 comprises a flow control assembly 90 including a sealing assembly 80, of the type described with reference to FIG. 8, the sealing assembly being indirectly connected with the hood 30. According to the first embodiment, the flow control assembly 90 including the sealing assembly 80 is placed on top of the hood 30, specifically on the hood cap 33, in axis with the hood through-hole 34. When the hood 30 is connected to the extension tube 19, the disposition of the expansible member 83 is such that the non-expandable portion 83b and thus the ring-shaped seal 82 lies below the pleated portion 83a.

Due to the pleated shape of the pleated portion 83a and the associated constraints in the axial direction, the expansible member 83 has overall inner and outer diameter which may vary along its length in operation. The inner diameter of the pleated portion 83a may vary in the axial direction as long as it allows the passage of the supporting rod 18a without a direct contact between the expansible member 83 and the supporting rod 18a.

The hood through-hole 34 has a diameter larger than the outer diameter of the non-expandable portion 83b so that the non-expandable portion 83b can be fitted inside the through-hole 34.

In the embodiment of FIGS. 6-7, the flow control assembly 90 includes an open box 51 positioned on the top of the hood 30, i.e. on hood cap 33, and axially centred to the through-hole 34. The open box 51 is open both at its bottom side to be in communication with inner space 37 of the hood 30 through the hood through-hole 34 and at its top side.

The box 51 can be made of metal, such as aluminium. In an embodiment, the box 51 has a generally cylindrical shape defined by sidewall 51b. The open box 51 may further comprise an outer flange 51a contiguous to the bottom side of the sidewall 51b and extending outwardly thereof. The open box 51 can be fixed onto the hood cap 33 by bolts, screws or clips at the outer box flange 51a (details not shown in the figures).

The open box 51 comprises an inward flange 51c positioned at the top side of the open box and extending radially inward with respect to sidewall 51b. The inward flange 51c is contiguous to the box sidewall 51b and provides an inwardly protruding supporting surface, which the sealing assembly 80 can be fixed on. In an embodiment, the inward flange 51c is one-piece with sidewall 51b, as shown in the enlarged portion of FIG. 7.

The expansible member 83 of the sealing assembly 80 is fixed to the open box 51 and housed therein. The pleated portion 83a and the non-expandable portion 83b are placed within the sidewall 51b.

The expansible member base 84 lays on and it is fastened to the box inward flange 51c through rivets 55. The box inward flange 51c extends radially inwardly so as to form an annular top surface while leaving a top opening for the open box. The box top opening defined by the inward flange 51c forms a box through hole.

The expansible member base 84 has an outer diameter larger than the diameter of the box through hole. In this way, by fastening the expansible member base 84 to the box inward flange 51c, the sealing assembly 80 partly covers the box through hole but for the hollow tubular space of the sealing assembly 80.

In the present embodiment, the expansible member 83 hangs by the expansible member base 84 into the open box 51, the expansible member 83 being free to move axially (up and down) to a certain degree by contracting and expanding the pleated portion 83a (and, to a lesser degree, radially).

Chiefly, the axial movement of the expansible member 83 takes place in the expandable pleated portion 83a, whereas the non-expandable portion 83b may move axially across a shorter length. Being operatively connected to the supporting rod 18a, the sealing assembly 80 provides for a sealed engagement with the supporting handle 18 that effectively reduces the escape of the processing gases from the interior of the sealed chamber (mainly from the hood through-hole 34), without impairing the movement of the supporting handle 18 through this chamber.

The open box 51 can provide protection to the polymeric elements of the expansible member 83 from ambient dust.

By significantly reducing the inflow of ambient air, the design according to this embodiment increases the purity of helium-containing gases flowing through the discharge port 46, thereby making helium recycling more efficient and profitable.

Detection pressure measurement devices (not shown) may be placed at the gas discharge port 46 to detect the outflow of the processing gases.

According to a second embodiment illustrated in FIGS. 5, 9-12, a flow control assembly 91 comprises a sealing assembly 80 as described in the foregoing. In this embodiment, the sealing assembly 80 is arranged, in the axial direction L, between the upper opening 23 of the extension tube 19 and the through-hole 34 of the hood 30, within the sidewall 31 of the hood 30 (i.e. within the hood inner space 37). The disposition of the expansion member 83 is such that the non-expandable portion 83b housing the ring-shaped seal 82 lies above the pleated portion 83a. The hood through-hole 34, the upper opening 23 as well as the expansible member 83 have respective diameters sized to leave a radial gap around the supporting rod 18a for an axial movement through the hood 30 with limited radial offset.

In the embodiment of FIGS. 9-12, the flow control assembly 91 comprises a plurality of springs 62 (in the non-limiting illustrated example four springs) extending in the axial direction L, the springs 62 radially surrounding the expansible member 83. In an embodiment, the springs 62 are mounted on respective vertical supporting elements, such as vertically arranged rivets 63. Springs 62 have a spring length and rivets 63 extend in the vertical direction for a length portion of the spring length.

In an embodiment, the springs 62 are fixed, at one end, by the rivets 63 on a supporting flange 61, which is placed on the cover plate 22 of the extension tube 19, within the inner space 37 of the hood 30. The supporting flange has a generally cylindrical shape.

The springs 62, which may be coil springs, extend from the supporting flange 61 to the inner surface of the hood cap 33 in a partially compressed condition, which is pre-set depending on the expected processing parameters, in particular the pressure of the gas outflow. The pre-set compressed condition is slight in absence of the processing gases and/or at the beginning of the process of dehydration or consolidation of the preform. In particular, in these conditions, the hood cap 33 of the hood 30 slightly urges the springs 62 down in the axial direction. The springs 62 absorb the stress otherwise exerted on the sealing assembly 80 and the supporting flange 61 and thus against the cover plate 22 which, being made of quartz, could be damaged.

In the case of presence of higher overpressure in the muffle tube 11 and extension chamber 21 during processing of the preform, e.g. due to blocking of the exhaust pipe 35, the springs 62 allow the outflow of gases to outflow from the extension chamber 21 underneath the supporting flange 61 through the through-hole 34 of the hood 30.

Supporting flange 61 has a ring shape with a central axis, which is substantially coincident with the central axis of the upper opening 23 of the cover plate 22, on which the flange 61 is provided (i.e. Z axis). Supporting flange 61 has an outer sidewall 61a facing the exterior of the flange and an upper surface 61b.

The supporting flange 61 can be made of metal, such as aluminium.

The pleated portion 83a of the expansible member 83 is fastened to the supporting flange 61 through the expansible member base 84. Specifically, the base 84 is fastened to the upper surface 61b of the supporting flange 61. Thus, the sealing assembly 80 and in particular the expansible member 83 is vertically constrained only at one end, but anywhere else the expansible member 83 can freely move axially. The ring-shaped seal 82, operatively surrounded by the non-axially expandable portion 83b, tightly engages the supporting rod 18a thereby closing through-hole 34 of cap 33 to the exterior, with consequent reduction the outflow of gases. In an embodiment, a washer 65, for example made of fluoropolymer like polytetrafluoroethylene, is disposed between the cover plate 22 and the outflow flange 61 in order to reduce the risk of damaging the cover plate 22, which is made of quartz. The supporting flange 61 is secured to the cover plate 22 by virtue of the compression exerted by the springs 62 onto the hood cap 33.

In an embodiment, the upper surface 61b of the supporting flange 61 has respective axial holes 61c (shown in FIG. 10) for the insertion of the rivet 63 to be mounted on the supporting flange 61. Rivets 63 may be made of metal, for example of aluminium.

In one or more embodiments, the supporting flange 61 has a hollow body limited in the radial direction by the outer sidewall 61a. In an embodiment, the supporting flange has no inner sidewall.

Opposite to the upper surface 61b, the supporting flange 61 has a lower surface (not visible) in contact with the washer 65.

In one or more embodiments in which the supporting flange 61 is hollow, its outer sidewall 61a has a radial through-opening 68 (FIGS. 10 and 11). The radial through opening 68 can lodge a connecting pipe 71 (FIGS. 11 and 12) to carry an outflow of the gases exiting the extension tube 19 from upper opening 23 to the outside of the apparatus 10, for example to a gas collector (non shown) for the recycling of the processing gases, in particular helium.

When the expansible member base 84 is fixed on upper surface 61b of the hollow supporting flange 61, the base 84 covers the upper opening 23 of the extension tube, except for the tubular hollow space within the expansible member 83. However, in view of the presence of the ring-shaped seal 82 in a tight connection with the supporting rod 18a, the outflow of the gases exiting the extension chamber 19 is substantially fully conveyed out through the opening 68 of the outflow flange 61.

The Applicant has considered that the outflow of gases from the muffle tube 11 through the sealed chamber 11, 19 by means of an exhaust port of a relatively large outflow cross-section leads to a fast extraction of gases, thus to a fast extraction of helium. Provision of a pipe of relatively small cross-section for the outflow decreases the extraction velocity and/or the flow rate of the exhaust gases, thereby decreasing the usage of helium during the processing of the preform.

The connecting pipe 71 is provided to collect the gases exiting the furnace from upper opening 23. To this end and according to the embodiment shown in the Figures, the exit of the radial opening 68 is connected to the connecting pipe 71 by means of a pipe coupler 69, which couples the radial opening 68 with the pipe 71 (FIG. 11). The connecting pipe 71 exits the hood 30 through gas discharge opening 46 and has a pipe outlet 74. The pipe outlet 74 can be connected to an external exhaust pipe, such as to exhaust pipe 35 (FIGS. 1-3), for the discharge of gases or to a different exhaust pipe or system.

As from the FIGS. 11 and 12, the diameter of the connecting pipe 71 is smaller than the diameter of the discharge opening 46. In an embodiment, the connecting pipe 71 has an orifice of cross-sectional area/diameter of 6 to 10 mm.

In an embodiment, the pressure of the outflowing gasses is controlled to estimate the usage of the gas, such as helium or a gas mixture containing helium. To this purpose and according to an embodiment, a differential pressure cell (DP cell) 72 is arranged along the pipe 71 to intercept the gas flow for measurement of a gas differential pressure across the pipe orifice. In known ways, the DP cell 72 is in communication also with the external air to determine the values of differential pressure from the values of ambient pressure and of the outgoing gas (FIG. 12).

In an embodiment, downstream the DP cell 72, pressure of the outflowing gas is controlled by a mass flow controller (MFC) 73 or through a control valve (not shown), which also maintains the desired pressure. The helium pressure may range between 3 and 15 torr.

In a gas having He of 1 to 8 slpm, Cl$_2$ from 0.02 to 2 slpm, and O$_2$ from 0.1 to 1 slpm, preferably, the pressure inside the processing chamber is of from 1 and 15 Torr, more preferably from 3 to 7 Torr, for example 5 Torr.

In case of damage of the supporting flange or of undesired inflow of atmospheric air, the outflow of gases may be aspirated through the discharge port 46 to be conveyed to an exhausted gas system (not shown).

Example 1

Several glass optical fibre preforms were fabricated by using an apparatus as described in WO 2018/177514, indicated as comparative apparatus A, or by using an apparatus, which is consistent with the embodiment described with reference to FIGS. 6-7 and indicated as apparatus B. Except for the provision of the flow control assembly described in the foregoing, the apparatus B corresponds to the apparatus A. The inner diameter of the muffle tube and of the extension tube, namely the diameter of the extended chamber, was of 330 mm. Helium was flown through the extended chamber at various flow rates. For apparatus A, the exhaust pressure (measured in the exhaust pipe 35) was −1.5 Torr, whereas for apparatus B the pressure was −0.2 Torr. The quality of the fibres drawn from the optical fibre preforms was checked by determination of DCDR values. A DCDR value is herein defined as the ratio between the sum of all the fibre length portions shorter than 18 m of the drawn optical fibre found, while drawing, to be defective in the diameter measurements, and the overall drawn fibre length.

TABLE 1

| He flow (slpm) | DCDR Apparatus A | DCDR Apparatus B |
| --- | --- | --- |
| 25 | 100% | <2% |
| 30 | 100% | <1% |
| 35 | <2% | <1% |
| 40 | <1% | <1% |

With reference to Table 1, at relatively low values of He flow up to 30 slpm (standard liter per minute), apparatus A exhibits an unsatisfactory performance with very high DCDR values, in the practice all of the fibre length portions shorter than 18 m are defective and there is no fiber length portion longer than 18 m without defects. In contrast, at the same helium flow, apparatus B shows a satisfactory performance with DCDR values of less than 1%. While the standard apparatus A needs to use more than 30 splm to provide a valuable optical fibre, apparatus B in accordance with the present disclosure provides a valuable drawn fibre even with a lower Helium flow (25 splm).

Example 2

Several glass optical fibre preforms were fabricated by using the apparatus as described in WO 2018/177514, indicated as comparative apparatus A, or by using an apparatus consistent with the embodiment described with reference to FIGS. 5, 9-11 and indicated as apparatus C. Except for the provision of the flow control assembly, the apparatus C corresponds to the apparatus A. The diameter of the muffle tube and extension tube (extended chamber) was of 330 mm. Helium was flown through the extended chamber at the range rate indicated in Table 2. For apparatus A, the exhaust pressure (measured in the exhaust pipe 35) was −1.5 Torr, whereas for apparatus C the pressure was +1/15 (0.06) Torr. The quality of the fibres drawn from the optical fibre preforms was checked by determination of DCDR values.

TABLE 2

| He flow (slpm) | Apparatus A DCDR | Apparatus C DCDR |
| --- | --- | --- |
| 3 ÷ 5 | 100% | <1% |

At very low values of He flow, i.e. 3 to 5 slpm, apparatus A exhibited an unsatisfactory performance with very high DCDR values. In contrast, within the same range of helium flow, apparatus C shows a satisfactory performance with DCDR values of less than 1%.

In addition, due to the very low value of He flow rate, the preforms consolidated in the Apparatus C needed an outgassing process for a length of time that was 40%-60% shorter than that needed with a standard apparatus.

Example 3

The composition of the outflow gas mixture was measured in the exhaust pipe 35 (consolidation end) of apparatus B of the present disclosure and after various purification steps. The composition is set forth in Table 3.

TABLE 3

|  | He % | Cl$_2$ % | O$_2$ % | N$_2$ % |
| --- | --- | --- | --- | --- |
| @ consolidation end | 95.4 | 1.9 | 2.7 | 0.005 |
| after Cl$_2$ removal | 97.3 | — | 2.7 | 0.005 |
| after O$_2$ removal | 99.995 | — | — | 0.005 |

The amount of He in the composition of the outflow gas mixture makes its recovery economically convenient as the amount of the gases other than He are low and their elimination yields a substantially pure He.

By applying the apparatus B of the present disclosure, it was possible to recover He at a higher purity. With the comparative apparatus A, due to the entrance of atmospheric air in view of the absence the sealing assembly of the present disclosure, the recovery was not industrially convenient with the same recovery apparatus. In the comparative apparatus A, the amount of 02 was much higher (14%) and He was very diluted.

Previously described embodiments refer to an apparatus for dehydration and consolidation using an extended chamber formed by the connection of the furnace chamber with an upper extension tube. In an operative condition of the furnace, the extension tube is at a temperature lower than the temperature within the furnace because of the axial distance from the heaters 12, 13. This is particularly the case for the top portion of the extension tube at which the sealing assembly is arranged. Typical temperatures at the top portion of the extension tube 19 of length of from 500 to 1500 mm, are not higher than 400° C. Polymeric materials included in the sealing assembly according to the present disclosure are selected to withstand these temperatures.

The invention claimed is:

1. An apparatus for drying and/or consolidating an at least partially porous optical fibre preform, comprising:
   a furnace comprising a muffle tube extending along a vertical axis (Z) and forming a hollow muffle chamber configured to house a preform, the muffle tube having a muffle opening at its top side, which is configured to allow passage of the preform;

an extension tube forming a hollow extension chamber configured to house at least a length portion of the preform and having a central axis aligned in the vertical axis (Z), wherein the extension tube has a lower opening and upper opening placed at the top side of the extension tube and opposite to the lower opening, and wherein the extension tube is removably attached to the muffle tube at the lower opening so as to close the muffle opening when the extension tube is joined to the muffle tube to form a single chamber, a hood placed on a top side of the extension tube and removably fixed to the same, the hood defining an inner space when fixed to the extension tube and including a discharge port and a hood cap with a hood through-hole which is substantially axially aligned to the upper opening, the hood through-hole and the upper opening being configured for the passage of a cylindrical supporting rod of a supporting handle for the suspension of the preform, and a flow control assembly including a sealing assembly operatively connected with the hood and substantially centred about the vertical axis (Z), wherein the sealing assembly includes a ring-shaped seal and an expansible member having a generally tubular shape configured to allow passage of the supporting rod and to expand and contract in a vertical direction (L), wherein the ring-shaped seal is located radially inward of the expansible member and operatively connected thereto and has an inner diameter configured to directly contact the supporting rod.

2. The apparatus of claim 1, wherein the expansible member includes:
 a pleated portion configured to expand and contract in the axial direction thereby varying its axial length,
 a non-axially expandable portion contiguous to the pleated portion in the axial direction, and
 an expansible member base contiguous to the pleated portion and opposite to the non-expandable portion, the expansible member base extending radially outwardly of the pleated portion,
wherein the ring-shaped seal is engaged to the non-axially expandable portion.

3. The apparatus of claim 2, wherein:
 the flow control assembly is housed within the inner space of the hood between the hood cap and the upper opening of the extension tube, and
 the sealing assembly is arranged so that the non-axially expandable portion engaging the ring-shaped seal lies above the pleated portion.

4. The apparatus of claim 3, wherein the extension tube includes a cover plate at its top side, the cover plate including the upper opening, and wherein the hood is removably fixed to the cover plate, and the flow control assembly further comprises:

a plurality of springs radially surrounding the expansion member, and
 an annular supporting flange placed on the cover plate of the extension tube and below the expansible member base, about the vertical axis (Z) and around the upper opening, the plurality of springs being mounted in the annular supporting flange, and extending therefrom toward the hood cap.

5. The apparatus of claim 4, wherein the supporting flange comprises an upper surface, the sealing assembly is fixed to the upper surface, and the springs have a spring length sized to extend from supporting flange to the hood cap in a pre-set partially compressed condition.

6. The apparatus claim 4, wherein the supporting flange includes an outer sidewall around a hollow body, the outer sidewall has a radial through opening.

7. The apparatus of claim 6, comprising a connecting pipe coupled to the radial through opening and in communication with the exterior of the hood through the gas discharge port.

8. The apparatus of claim 4 comprising a washer between the cover plate and the supporting flange.

9. The apparatus of claim 1, wherein the expansible member has an inner diameter which varies across its length down to a minimum value, the minimum value of the expansible member being larger than the inner diameter of the seal so as to allow the passage of the supporting rod.

10. The apparatus of claim 1, wherein the extension tube includes a cover plate at its top side, the cover plate including the upper opening, and wherein the hood is removably fixed to the cover plate.

11. The apparatus of claim 1, wherein:
 the flow control assembly is placed on top of the hood and comprises an open box placed at a top side of the hood substantially axially centred to the hood through-hole, the box is open at its bottom side to be in communication with the inner space of the hood through the hood through-hole, and
 the open box surrounds and houses the sealing assembly.

12. The apparatus to claim 11, wherein the sealing assembly is substantially axially centred to the hood through-hole and operatively connected to the open box.

13. The apparatus of claim 11, wherein the open box has a sidewall and a box flange contiguous to the sidewall and extending radially inwardly therefrom and defining a box through hole.

14. The apparatus of claim 13, wherein the pleated portion and the non-expandable portion of the sealing assembly are placed within the sidewall, and wherein the expansible member base has an outer diameter and is fastened on the box flange, the box flange having an inner diameter smaller than the outer diameter of the expansible member base.

* * * * *